Patented Jan. 19, 1932

1,841,768

UNITED STATES PATENT OFFICE

FRITZ STRAUS, OF BRESLAU, AND LEO KOLLEK, OF MANNHEIM, GERMANY, ASSIGNORS TO WINTHROP CHEMICAL COMPANY, INC., OF NEW YORK, N. Y., A CORPORATION OF NEW YORK

CHLORINATED AND BROMINATED ETHINE CARBINOLS

No Drawing. Application filed April 21, 1930, Serial No. 446,182, and in Germany November 24, 1927.

The present invention relates to halogen-ethinyl alcohols and to a process of preparing same.

In accordance with the present invention an acetylene alcohol is caused to react in the cold in aqueous solution with a salt of the hypochlorous or hypobromous acid (i. e. those hypohalogenous acids which are derived from either chlorine or bromine) with the production of the corresponding halogen-ethine carbinols of the probable general formula:

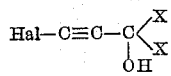

wherein "Hal" stands for chlorine or bromine, and wherein the X's stand for alkyl groups, similar or dissimilar, or wherein the two X's jointly stand for an alkylene residue containing at least 3 carbon atoms, the alkylene-residue forming an alicyclic nucleus with the carbon atom, bearing the hydroxy group.

The reaction probably performs, for example, when employing the sodium salt of the hypobromous acid and ethinyl-dimethyl-carbinol as starting materials, according to the following equation

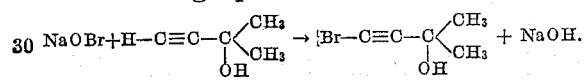

In this manner, for example, the chlorine- and bromine-derivatives of ethinyl-dimethyl-carbinol, ethinyl-diethylcarbinol, ethinyl-methyl-ethyl-carbinol, ethinyl-cyclobutanol, ethinyl-cyclohexanol, ethinyl-cycloheptanol and the like may be produced. We prefer to perform the reaction in the presence of an excess of a hydroxide of an alkali- or alkaline-earth-metal in the aqueous solution of the alkaline reacting alkali- or alkaline-earth-metal salt of the hypochlorous or hypobromous acid. Sometimes it is advisable to prohibit an increasing of the reaction temperature by cooling with ice.

The new halogen-ethinyl-alcohols can be distilled in vacuo and are white crystals, soluble in the usual organic solvents, practically insoluble in water. They are pharmaceutically valuable substances.

The invention is illustrated by the following examples, without being restricted thereto:—

*Example 1:—Diethyl-bromoethinyl-carbinol*

110 grams of diethyl-ethinyl-carbinol (Locquin and Sung, Bull. Soc. Chim. (IV), 35 (1924), page 601) are shaken with 1750 ccs. of an ice cold potassium hypobromite solution prepared in the proportion of 1000 ccs. of water, 225 grams of caustic potash and 32 ccs. of bromine, at room temperature during 30 minutes. The heavy oil obtained is taken up with low boiling petroleum ether, the solution is dried and after evaporating the solvent the residue is fractionated in vacuo. Under 13–14 mm. pressure the brominated alcohol of the probable formula:

distils as a colorless oil at 84–85° C. in a very good yield. It has a melting point of 16–18° C.

*Example 2:—1-Bromoethinyl-cyclohexanol-1*

10 grams of 1-ethinyl-cyclohexanol-1 (Locquin and Sung, Bull. Soc. Chim. (IV), 35 (1924), page 601) are liquefied by means of 5 ccs. of low boiling petroleum ether and strongly shaken with a cooled aqueous potassium hypobromite solution, prepared by mixing 5 ccs. of bromine with 170 ccs. of 28% caustic potash solution. After 30 minutes the reaction product is separated off by means of ether. Under 11–12 mm. pressure it has the boiling point 111–112° C. The 1-bromo-ethinyl-cyclohexanol-1 obtained of the probable formula:

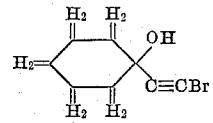

quickly solidifies to a snow-white crystal mass of the melting point 55.5–56° C. The same product is obtained when 50 grams of ethinyl-cyclohexanol are strongly shaken with a solution of calcium-hypobromite, prepared with 1600 ccs. of water, 180 grams of calcium oxide and 150 grams of bromine, during half an hour. The product obtained is separated off by means of ether. From the ethereal solution the 1-bromo-ethinyl-cyclohexanol is obtained as stated above.

*Example 3:—1-Chloroethinyl-cyclohexanol-1*

30 grams of 1-ethinyl-cyclohexanol-1 are liquefied with 50 ccs. of petroleum ether of the boiling point 40–60° C. The solution obtained is shaken at room temperature during 12 hours with 880 ccs. of an ice cold potassium hypochlorite solution containing about 2 mols of potassium hypochlorite (such a hypochlorite solution is prepared, for example, by saturating a solution of 120 grams of potassium hydroxide in 800 ccs. of water with chlorine while cooling with ice, until litmus just is bleached, and then diluting the mixture obtained with a solution of 240 grams of potassium hydroxide in 800 ccs. of water). The reaction product is taken up with petroleum ether, the solution is dried and the solvent is distitlled off. The 1-chloro-ethinyl-cyclohexanol-1 remains as a white crystalline mass of the melting point 51–52° C. It boils under a pressure of 13 mm. at 98° C. and can be recrystallized from petroleum ether.

This is a continuation in part application of our copending application Ser. No. 318,587, filed November 10, 1928.

We claim:

1. The process which comprises subjecting an ethinyl-carbinol of the probable general formula:

wherein the X's stand for alkyl groups or the two X's jointly stand for an alkylene-residue containing at least 3 carbon atoms, to the action of a salt of a hypohalogenous-acid derived from a halogen of the group consisting of chlorine and bromine in an aqueous solution.

2. The process which comprises subjecting an ethinyl-carbinol of the probable general formula:

wherein the X's stand for alkyl groups or the two X's jointly stand for an alkylene-residue containing at least 3 carbon atoms, to the action of a salt of hypohalogenous acid derived from a halogen of the group consisting of chlorine and bromine in an aqueous solution, containing a hydroxide of the group consisting of alkali- and alkaline-earth-metal hydroxides.

3. The process which comprises subjecting an ethinyl-dialkyl-carbinol of the probable general formula:

to the action of a salt of a hypohalogenous acid derived from a halogen of the group consisting of chlorine and bromine in an aqueous solution.

4. The process which comprises subjecting an ethinyl-dialkyl-carbinol of the probable general formula:

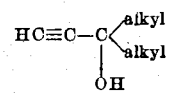

to the action of a salt of a hypohalogenous acid derived from a halogen of the group consisting of chlorine and bromine in an aqueous solution containing a hydroxide of the group consisting of alkali- and alkaline-earth-metal hydroxides.

5. The process which comprises subjecting ethinyl-diethyl-carbinol to the action of a salt of a hypohalogenous acid derived from a halogen of the group consisting of chlorine and bromine in an aqueous solution.

6. The process which comprises subjecting ethinyl-diethyl-carbinol to the action of an alkali-metal salt of the hypobromous acid in an aqueous solution containing a free alkali metal hydroxide.

7. The process which comprises subjecting 110 grams of diethyl-carbinol to the action of 1750 ccs. of an ice cold potassium hypobromite solution prepared in the proportion of 1000 ccs. of water, 225 grams of caustic potash and 32 ccs. of bromine, at room temperature for 30 minutes, taking up the heavy oil obtained with low boiling petroleum ether, drying the solution obtained and fractionating the residue in vacuo after evaporating the solvent.

8. Halogen ethinyl-alcohols of the probable general formula:

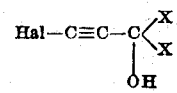

wherein Hal stands for a halogen of the group consisting of chlorine and bromine, the X's stand for alkyl groups or the two X's jointly stand for an alkylene-residue containing at least 3 carbon atoms, said halogenethinyl-alcohols being colorless products, soluble in alcohols and ether, being pharmaceutically valuable substances.

9. Halogen ethinyl-carbinols of the general formula:

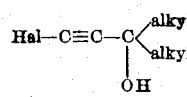

wherein Hal stands for a halogen of the group consisting of chlorine and bromine, said halogenethinyl-carbinols being colorless products, soluble in alcohol and ether, being pharmaceutically valuable substances.

10. The bromoethinyl-diethyl-carbinol of the probable formula:

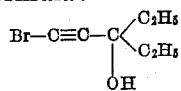

having a boiling point of 84–85° C. under 13–14 mm. pressure, having a melting point of 16–18° C., being soluble in alcohol, acetone and ether, insoluble in water, being suitable for therapeutic use.

11. The bromoethinyl-cyclohexanol-1 of the probable formula:

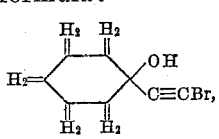

having a boiling point of 111–112° C. under 11–12 mm. pressure, forming snow-white crystals of the melting point 55.5–56° C., being soluble in alcohol, acetone and ether, insoluble in water and being suitable for therapeutic use.

12. The 1-chlorothinyl-cyclohexanol-1, having a boiling point of 98° C. under 13 mm. pressure, forming white crystals of the melting point 51–52° C., being soluble in alcohol, ether, acetone and petroleum ether and being suitable for therapeutic use.

In testimony whereof, we affix our signatures.

FRITZ STRAUS.
LEO KOLLEK.